No. 644,387.   
J. T. WEST.  
REIN GUARD.  
(Application filed Aug. 19, 1899.)  
Patented Feb. 27, 1900.
(No Model.)
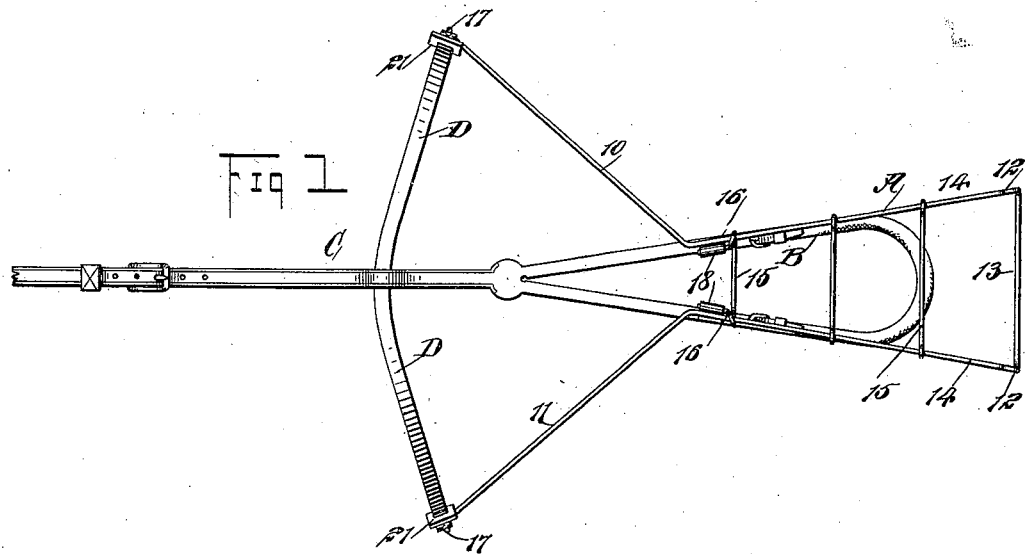
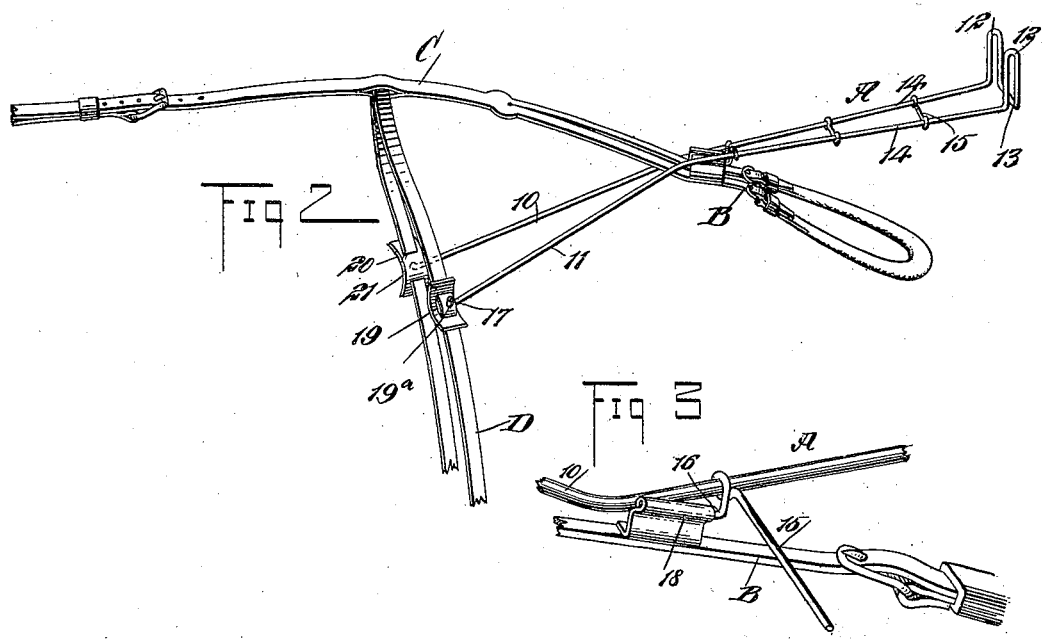
WITNESSES:
INVENTOR  
John T. West  
BY  
ATTORNEYS

United States Patent Office.

JOHN THOMAS WEST, OF BOWLING GREEN, KENTUCKY.

REIN-GUARD.

SPECIFICATION forming part of Letters Patent No. 644,387, dated February 27, 1900.

Application filed August 19, 1899. Serial No. 727,789. (No model.)

*To all whom it may concern:*

Be it known that I, JOHN THOMAS WEST, of Bowling Green, in the county of Warren and State of Kentucky, have invented a new and Improved Rein-Supporter, of which the following is a full, clear, and exact description.

One object of the invention is to provide a device applicable to any harness and which is especially adapted for supporting the reins at such an elevation from the crupper as to effectually prevent the reins from becoming entangled with the harness or with the tail of the animal driven.

Another object of the invention is to construct a rein supporter and guide in such manner that it will be simple, light, and economic and so that it may be quickly and conveniently applied to the harness or detached from the same.

A further object of the invention is to construct a rein-supporter which will not detract from the appearance of either the animal or the harness.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved device and that portion of the harness to which it is attached. Fig. 2 is a perspective view of the device and that portion of the harness to which it is applied, and Fig. 3 is a detail perspective view illustrating the manner in which the frame of the device is removably attached to the harness.

The device consists of a frame A, preferably of skeleton formation, and arms 10 11, which form forward continuations of the sides of the frame A. The arms diverge at their forward ends and are given more or less of a downward inclination. The frame A is provided with vertical guide-fingers 12 at the sides of its rear end, and preferably the frame A and the arms 10 and 11, extending from the frame, are made from one piece of material—namely spring-wire—of suitable gage.

In the detail construction of the frame A said frame is wider at its rear than at its forward end and consists of a rear cross-bar 13, extending from one finger 12 to the other, and side bars 14. The frame is preferably provided with cross-bars 15, also of wire or a like material, and these cross-bars are attached to the side bars of the frame in any suitable manner. Each side bar 14 of the frame A at the forward end of said frame is provided at its inner side with a forwardly-extending and substantially-horizontal pin 16, and if in practice it is found desirable, and as illustrated in Fig. 3, these pins may be formed continuous with the forward cross-bar 15. In the further construction of the device each arm 10 and 11 is made to terminate in an upwardly-extending hook or pin 17.

The pins 16, secured to the body of the device, are adapted to enter sockets or eyes 18, secured to the crupper-strap B or, if desired, to the rear portion of the back-strap C, and the pins or hooks 17, forming the terminals of the arms 10 and 11, are made to enter openings 19ª in loops 19, which loops are formed in the hip-strap D at a suitable point below the connection of the hip-strap with the back-strap, as shown best in Fig. 2. The loops 19 are usually formed in the hip-strap D by causing the strap to pass through slots 20, produced in slides 21. The hip-strap when passed through the slots of the slides extends across the outer faces thereof, and in this manner the loops 19 are conveniently formed without marring the harness.

When the device is placed in position on a horse, the frame A has an upward and rearward inclination above the crupper, as is best shown in Fig. 2, while the arms 10 and 11 extend downwardly and forwardly along each hip of the animal. It is evident that this device can be made very light and yet very strong and that it may be quickly and conveniently applied to a harness or detached therefrom, since it connects with but two parts of a harness—namely, the crupper-strap or the back-strap and the hip-strap.

The fingers 12 may be wider at the base than illustrated and their forward members inclined from the top downwardly and forwardly. Any desired number of cross-bars 15 may be employed, and the pins 16 may face rearwardly instead of forwardly, as shown, and the frame A may be shaped to the animal and may be made in two hinged parts, if desired.

Having thus described my invention, I claim as new and desire to secure by Letters Patent—

1. A rein-supporter adapted for attachment to a harness, and consisting of a frame provided with rein-guides at its rear end and arms at its forward end, the forward ends of the said arms being constructed for engagement with the harness, and a fastening-pin carried by the frame at each side and adapted to engage sockets or eyes on the harness substantially as described.

2. A rein-supporter consisting of a frame having rein-guides at its rear end and forwardly-extending arms at its forward end, the forward portions of said arms being bent to form a hook or pin adapted to engage the harness and a fastening device comprising an approximately-horizontal pin carried at each side of the body of the frame the ends of the said arms and the horizontal pins being arranged for detachable connection with a harness, substantially as set forth.

3. A rein-supporter adapted for attachment to the straps of a harness and comprising a frame having a body portion provided with vertical guide-fingers at its rear end and diverging arms at its forward end, and cross-bars connecting the sides of the body portion of the frame, each side of the body portion of the frame at the forward end being provided at its inner face with a forwardly-extending and substantially-horizontal pin, and the forward ends of the said arms each having an upwardly-extending member, for the purpose set forth.

4. The combination, with the strap to which the crupper is attached, the said strap being provided with sockets, and the hip-strap of a harness, of a rein-supporter consisting of a frame provided with rein-guides at its rear end and forwardly-extending arms at its forward end, the said arms having a downward inclination, which arms diverge at their forward portions, each arm being provided with means for attachment to the hip-strap, and fastening devices carried by the frame, adapted to enter the said sockets for the purpose set forth.

5. A rein-supporter adapted for attachment to the straps of a harness, and comprising a frame having a body portion provided with vertical guide-fingers at its rear end and arms at its forward end, cross-bars connecting the sides of the body portion of the frame, each side of the body portion of the frame at the forward end being provided with an approximately-horizontal pin and the forward ends of the said arms each having an approximately-right-angle bend, substantially as described.

6. The combination with the straps to which the crupper is attached, the said straps being provided with sockets and the hip and back straps of the harness, of a rein-supporter consisting of a skeleton frame provided with rein-guides at its rear end and forwardly-extending arms at its forward end, the said arms being provided with means for attachment to the harness, and fastening devices carried by the body of the frame at each side thereof and adapted to enter the said sockets for the purpose set forth.

JOHN THOMAS WEST.

Witnesses:
KEITH PILLSBURY,
R. C. P. THOMAS.